June 11, 1940.                B. J. CRAIG                2,204,208
                    LATCH FOR AUTOMOTIVE VEHICLE DOOR
                    Filed Aug. 22, 1939        6 Sheets-Sheet 1

INVENTOR.
B. J. Craig

June 11, 1940.  B. J. CRAIG  2,204,208
LATCH FOR AUTOMOTIVE VEHICLE DOOR
Filed Aug. 22, 1939  6 Sheets-Sheet 4

INVENTOR.
B. J. Craig.

June 11, 1940. B. J. CRAIG 2,204,208
LATCH FOR AUTOMOTIVE VEHICLE DOOR
Filed Aug. 22, 1939 6 Sheets-Sheet 5

INVENTOR.

Patented June 11, 1940

2,204,208

UNITED STATES PATENT OFFICE 2,204,208

LATCH FOR AUTOMOTIVE VEHICLE DOORS

Burnie J. Craig, Los Angeles County, Calif.

Application August 22, 1939, Serial No. 291,341

36 Claims. (Cl. 180—82)

REISSUED
NOV 7 1950
RE 23292

This invention relates to door latching and control mechanism which is particularly, although not exclusively, adapted for use in connection with the door of automotive vehicles.

The general object of the invention is therefore to provide an improved latch construction for automotive vehicle doors permitting quiet and positive latching and ready opening.

A more specific object of the invention is to provide a novel automotive vehicle door latching mechanism wherein improved means is provided for controlling the latch bolt in its movement to and/or from latched position.

Another object of the invention is to provide a novel speed controlled latch bolt for an automotive vehicle door.

Another object of the invention is to provide a novel release for an automotive vehicle door latch bolt.

A further object of the invention is to provide a novel handle and bolt release member for an automotive vehicle door latch.

Another object of the invention is to provide a novel means for controlling a movement of the latch bolt of an automotive vehicle door latch.

Another object of the invention is to provide a latch including a novel outside handle and bolt release member.

An additional object of the invention is to provide an automotive vehicle door latch mechanism including a novel bolt construction.

A further object of the invention is to provide a latch including a novel member operable to either lock or to release the bolt.

Other objects and the advantages of my invention will be apparent from the following description taken in connection with the accompanying drawings, wherein:

Figure 1:
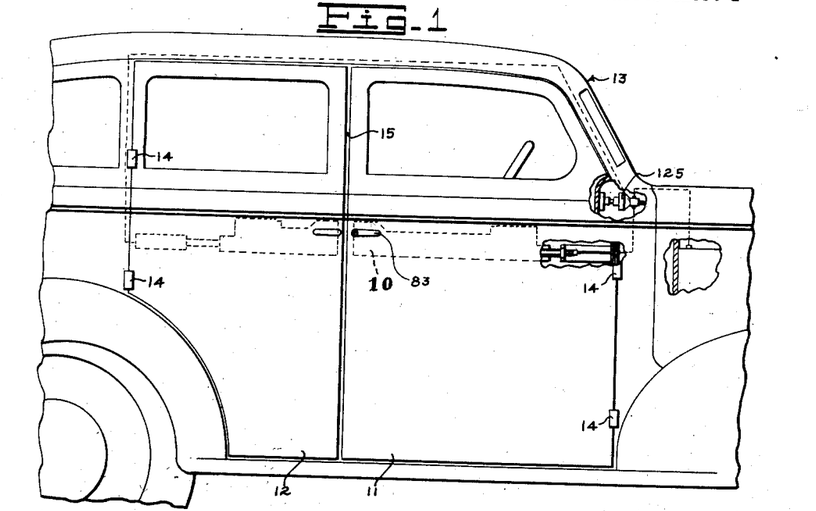
Fig. 1 is a side elevation with parts broken away showing an automotive vehicle with the present invention applied thereto.

In the accompanying drawings the invention is shown as embodied in an automotive vehicle door latch which is indicated generally at 10. A latch is shown as mounted upon each front door 11 and each rear door 12 of a sedan type automotive vehicle 13 wherein the doors are mounted on hinges 14 for movement towards and from body pillars 15.

The latches 10 upon the front doors 11 and the rear doors 12 are preferably identical with each other except that they are rights and lefts and that the key actuated lock is omitted on the rear doors.

Figure 2:
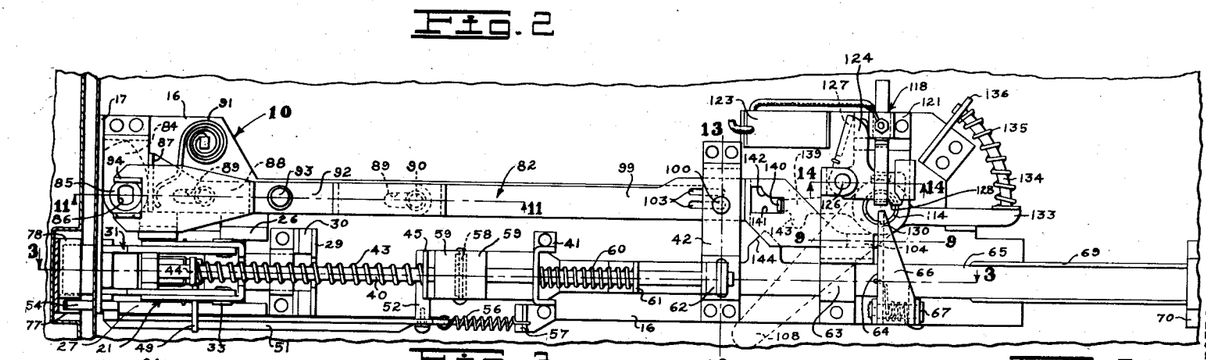
Fig. 2 is a side elevation, partly in section, showing the latch with the bolt in the advanced position.

The latch 10 includes a base plate 16 suitably secured to the inner wall of the vehicle door and has a selvage plate 17 bent therefrom with the latter plate having a rectangular bolt opening or slot 18 therein which is aligned with a slot 19 in the door edge. The inner edge of the slot 18 is defined by the plate 16 and the other edges as shown include portions 20 bent inwardly from the selvage plate.

The latch bolt includes a carriage 21 (see Fig. 18) having a side 22, an end 23, a flanged top 24, and a flanged bottom 25. The carriage is shiftably mounted on the base plate 16 with the flange on the top 24 slidably engaging tongues 26 bent from the plate 16 and with the flange on the bottom 25 slidably engaging a tongue 27 folded from the edge of the plate 16. The side 22 is extended as at 28 and has outwardly extending portions 29 thereon which (when the carriage is advanced) engage resilient cushion members 30 mounted on the base plate 16.

The carriage 21 supports a bolt 31 (see Fig. 17) which includes sides 32 pivoted at 33 to the carriage and a hollow head 34 which slides on the plate 16 and passes through the slot 18 in the selvage plate 17.

Figures 3, 4, 21, 22:
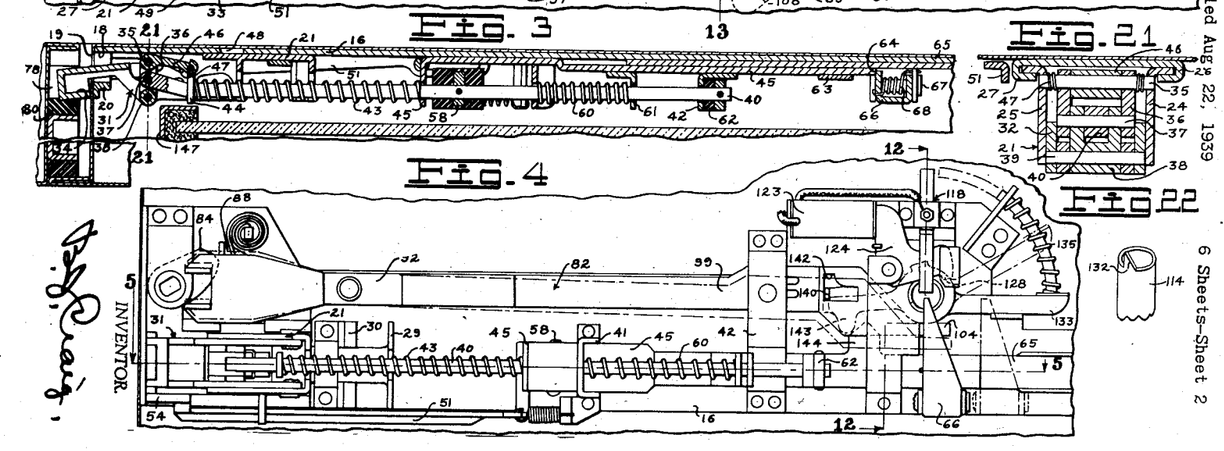
Fig. 3 is a section taken on line 3—3, Fig. 2.
Fig. 4 is a fragmentary side elevation showing the latch with the bolt in the retracted position.
Fig. 21 is a fragmentary section taken on line 21—21, Fig. 3.
Fig. 22 is a fragmentary perspective view of the remote control sleeve and cam.

A pin 35 on the carriage supports a pair of toggle links 36 (see Fig. 21) which are connected by a pin 37 with a bifurcated toggle link 38 mounted on a pin 39 supported on the forward portion of the bolt. The construction is such that the carriage and the bolt must be first advanced before the toggle can be straightened to shift the bolt head 34 about its pivot 33.

In order to advance the carriage and bolt the forward end of a rod 40 pivotally engages the toggle pin 37 while the rear end of the rod passes through an apertured bracket 41 and a second apertured bracket 42 both suitably mounted on the plate 16. The forward end of a spring 43 which surrounds the rod 40 engages a suitable stop member 44 on the rod. The rear end of the spring 43 engages a movable L-shaped abutment member 45 which is slidable on the plate 16 and beneath the brackets 41 and 42. The member 45 is suitably apertured to receive the rod 40.

A dog 46 mounted on the pin 35 is normally urged by a spring 47 into engagement with the end of a slot 48 in the plate 16. When the dog is in engaged position the bolt and carriage are held thereby against forward movement from a retracted position. An arm 49 is secured to the dog 46 and passes through a slot 50 in the carriage.

The outer end of the arm 49 is engaged by a release arm 51 which is pivotally and slidably mounted on a pin 52 which is secured to the abutment member 45 and which passes through a slot 53 in the release arm 51. The forward end of the release arm 51 terminates in an enlarged head portion 54 which is slidable in a slot 55 in the plate 17 adjacent the slot 18. A spring 56 urges the release arm 51 into retracted position against a resilient faced bracket 57 secured to the plate 16.

A stop member 58 having a resilient face 59 at each end is interposed between the outwardly extending portion of the abutment member 45 and the bracket 41 and is secured to the rod 40. A spring 60 disposed on the rod 40 between the bracket 41 and an apertured bracket 61 secured to the member 45 tends to urge the bolt and carriage into retracted position. A resilient cushioned stop member 62 is secured upon the rear end of the rod 40 and when the bolt is in the advanced position engages the bracket 42. The member 45 slides beneath a bracket 63 and terminates rearwardly as at 64.

Figure 6:
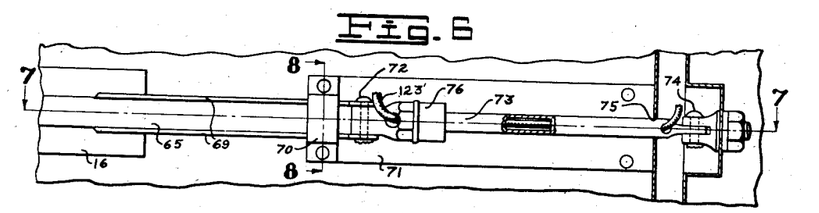
Fig. 6 is a fragmentary side elevation, partly in section, and with parts broken away showing the push member.
Figures 7, 8, 9:
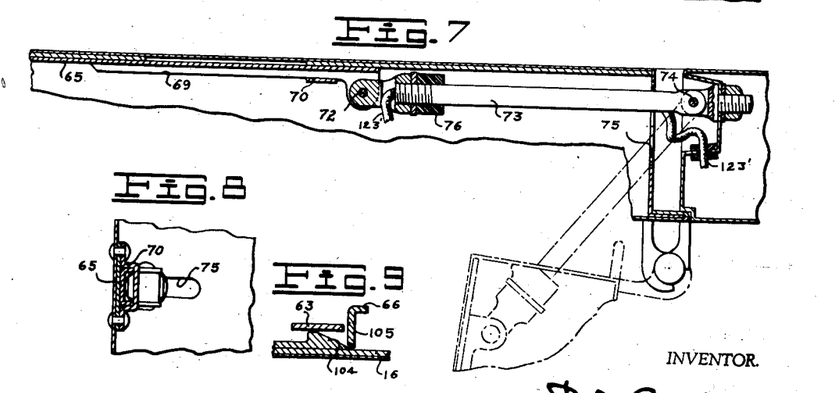
Fig. 7 is a section taken on line 7—7, Fig. 6.
Fig. 8 is a section taken on line 8—8, Fig. 6.
Fig. 9 is a fragmentary section taken on line 9—9, Fig. 2.

A push member 65 slides between the member 45 and the plate 16. A dog 66 adapted to engage the end 64 of the member 45 is pivoted to the push member 65 as at 67 and is urged to engaged position by a spring 68. The rear end of the push member 65 may include stiffening flanges 69 and is shown as slidable beneath a bracket 70 (see Fig. 6) mounted on a plate 71 secured to the door. At the rear end thereof the push member 65 is pivotally engaged as at 72 by one end of a tubular arm 73 the other end of which is pivoted as at 74 to a bracket on the door frame. The arm 73 passes through a slot 75 in the door and includes a resilient cushion 76 which limits the opening movement of the door.

As the door is closed from a fully open position it will be seen that the push member 65 is advanced until the dog 66 engages the end 64 of the member 45. Further motion of the door moves the abutment member 45 to thereby compress the springs 60 and 43 so that the head of the member 45 advances from cushion stop member 58 and advances the pin 52 until the latter engages the end of the slot 53 in the release arm 51. When the door is almost closed the head portion 54 of the arm 51 advances beyond the slot 55 and projects from the door.

Further motion of the door brings the head portion 54 into engagement with an engaging portion 77 on a strike 78 secured to the door frame. The arm 51 is then rocked about the pin 52 and moves the arm 49 secured to the dog 46 so that the latter is rocked to release the carriage. The carriage and bolt are then urged forwardly by the spring 43 until the motion of the carriage is arrested by the cushion members 30. The bolt sides 32 are each notched as at 79 so that when the carriage is fully advanced the notches are in alignment with the edge of the door and with the selvage plate 17.

In this position the bolt is free to be shifted laterally as the toggle is straightened until the stop member 62 on the end of the rod 40 engages the bracket 42. After the bolt head 34 has advanced and has moved laterally it engages a resiliently faced engaging portion 80 on the strike 78. Further lateral movement of the bolt moves the door to fully closed position firmly compressing the resilient bumper 81 disposed on the front of the strike where it is engaged by the door as the latter moves to fully engaged position. The spring 43 is so disposed and loaded that the toggle is held firmly straightened.

It will be seen that the above described action avoids slamming and permits easy and quiet closing while maintaining the door firmly in latched position.

When retracted the bolt remains in that position flush with the outer edge of the door so that there is no projecting portion to rub against the clothing or person of the passenger. Also as the bolt does not slidably engage its strike it is unnecessary to lubricate the strike or the bolt so that there is no exposed lubricant. Further as there is no sliding action under pressure between the bolt head and strike to cause wear neither the bolt nor the strike need be a hardened member but may be made as a stamping.

The head 54 of the release arm 51 is of such shape (see Fig. 10) that when the door is open and the arm is retracted the head fills the slot 55 and presents a flush outer surface. When the arm 51 is extended the head 54 is beyond the slot 55 so that the arm 51 is free to be rocked about its pivot 52.

In order to retract the bolt from the advanced position and free the door for opening the dog 66 must be released from engagement with the end 64 of the member 45 to allow the carriage and bolt to be returned by the action of the spring 60. When the dog 66 is tripped releasing the abutment member 45 the projecting portion of this member first engages the stop member 58 and being further moved carries the rod 40 rearward. This action first results in breaking the toggle to thereby shift the bolt laterally after which the bolt and carriage are retracted until the stop member 58 engages the bracket 41 at which time the dog 46 will be disposed in the slot 48.

Three means are shown by which the dog 66 may be tripped and thus the door opened: an outside door handle, an inner finger tip control, and an inside emergency release. The release mechanism is indicated generally at 82, and includes an outside door handle 83 and a roll back 84 mounted on a sleeve 85 rotatable on the plate 16. The sleeve 85 has a hole 86 therethrough which is defined by parallel sides and arcuate ends which are adapted to receive a similarly shaped end on the handle 83. The roll back 84 engages a tongue 87 bent up from a sliding member 88 which includes slots 89 which receive pins 90 secured to the plate 16. The sliding member 88 is urged toward the roll back by a spring 91 secured to the plate 16.

The release mechanism 82 further includes a control lever 92 pivoted to the member 88 at 93 and including wings 94 adjacent the sleeve 85. The wings 94 are engageable with an eccentric pin 95 (see Fig. 19) of a spindle lock shaft 96 which is of usual construction including a lock barrel 97. The lock shaft may be turned in either direction by a key and when released is returned by a spring 98. The normal unlocked condition is shown in Fig. 2. When the lock shaft is rotated from this position, the eccentric pin pushes the upper wing up thus lowering the other end 99 of the control lever 92. A reverse movement of the key reverses the direction of movement of the control lever. The details of the key operated lock form no part of the present invention and other types of locks may be employed.

The bracket 42 extends over the control lever 92 and as shown includes a barrel 100 (see Fig. 13) containing a spring 101 which urges a ball 102 into either of two grooves 103 in the control lever 92. This construction is such that the control lever may be rocked by the key to either upper or lower position so that the ball 102 enters either groove thus permitting the control lever 92 to be reciprocated bodily back and forth by the action of the roll back 84 without departing from its adjusted position.

A cam portion 104 on the end 99 of the control lever 92 is adapted to engage a companion portion 105 on the dog 66 when the control lever 92 is reciprocated while in the raised or unlocked condition. When the control lever 92 is in this position and is shifted by the outside handle through the roll back 84, the cam 104 engages the portion 105 on the dog 66 to swing the latter about its pivot so that it is raised from engagement with the end 64 of the member 45. If, however, the control lever 92 is turned by the key to the lower or locked condition and the lever 92 is then shifted by the roll back 84, the cam 104 does not engage the portion 105 but instead passes through a slot 106 in the dog 66 so that the dog is not released.

Figures 5, 10, 11, 12, 13, 14, 15, 16, 17, 18, 19, 20:
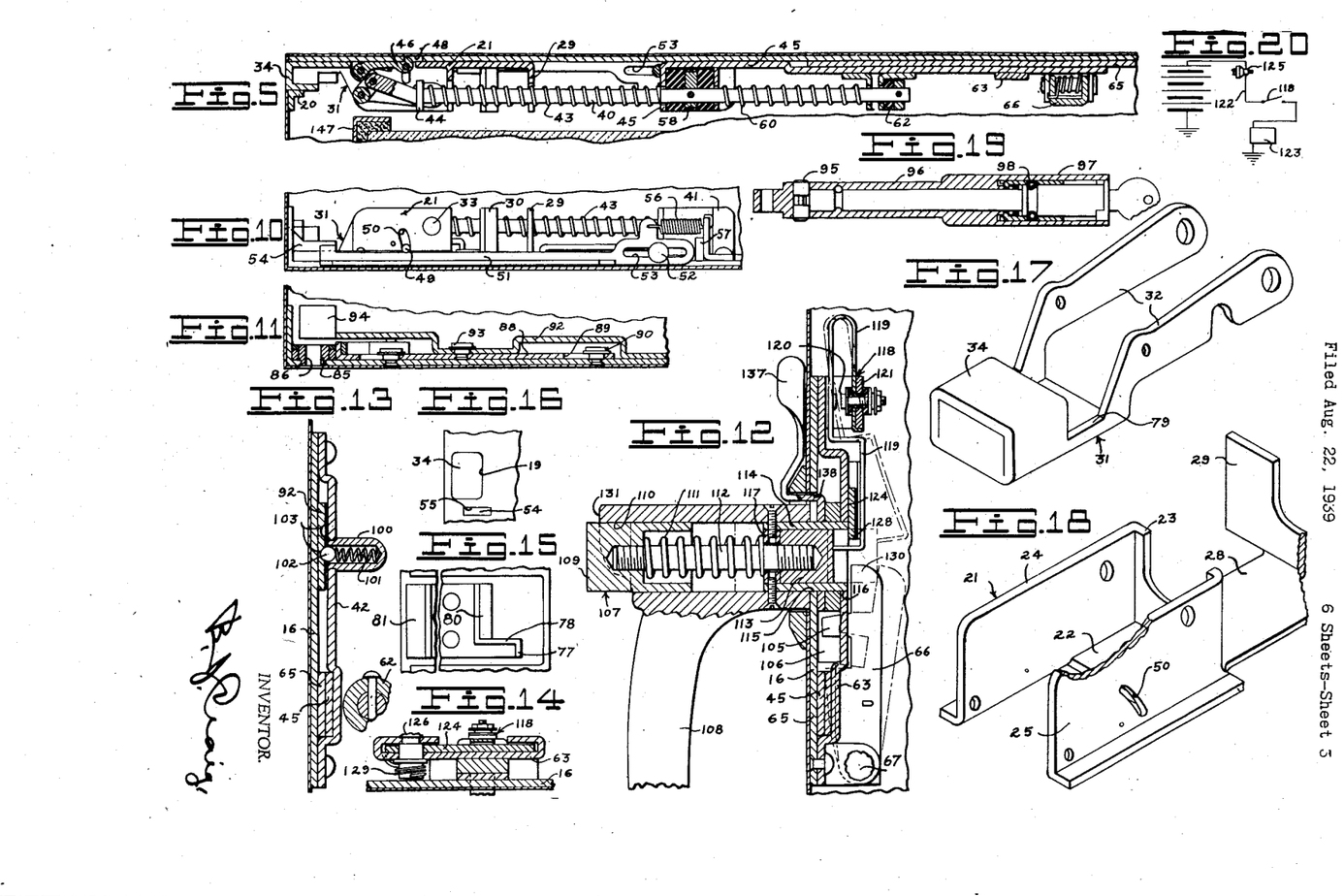
Fig. 5 is a section taken on line 5—5, Fig. 4.
Fig. 10 is a fragmentary bottom plan view partly in section showing the bolt assembly.
Fig. 11 is a fragmentary section taken on line 11—11, Fig. 2.
Fig. 12 is a section taken on line 12—12, Fig. 4 showing the remote control handle in the unlocked position.
Fig. 13 is a section taken on line 13—13, Fig. 2.
Fig. 14 is a fragmentary section taken on line 14—14, Fig. 2.
Fig. 15 is an elevation of the strike.
Fig. 16 is an elevation of the end of the door showing the bolt and dog releasing arm aperture.
Fig. 17 is a perspective view of the bolt.
Fig. 18 is a perspective view of the carriage.
Fig. 19 is a sectional view of the key operated lock.
Fig. 20 is a wiring diagram.

The dog 66 may be also released by a finger tip control 107 which is preferably built into the handle 108 of a remote control assembly on the inside of the door as shown in Fig. 12. As shown the finger tip control 107 includes a thumb or finger tip operable button 109 slidable in a bore 110 in the handle 108 and urged outwardly by a light spring 111 encircling a rod 112 connecting the button 109 with a plunger 113 which slides within a sleeve 114 rotatable within an aperture 115 in the plate 16 and an aligned aperture 116 in the bracket 63. A stop member 117 is secured within the sleeve 114.

The initial or preliminary movement of the button 109 and plunger 113 operates an electrical switch 118. The switch includes a bent resilient strip 119, contacts 120 and a supporting bracket 121. The switch 118 controls a circuit 122 (see Fig. 20) to an electro-magnet 123 which in turn operates a dog 124 from its normal position which limits further motion of the plunger 113 to a position which permits further movement of the plunger.

As shown in the wiring diagram the circuit includes a suitable speed influenced member 125 which is subject to the speed of the vehicle and the construction is such that the circuit to the electro-magnet 123 is rendered inoperative when the speed of the vehicle exceeds a certain rate but is operative when the vehicle is below the certain rate. The speed controlled member 125 may be of any type e. g. it may be of the type disclosed in the applicant's prior application, Serial No. 206,534, filed May 7, 1938.

The dog 124 (see Fig. 14) is pivoted to the bracket 63 as at 126 and includes an armature portion 127 adjacent the electro-magnet 123 and a portion 128 adjacent the sleeve 114 the latter portion being in the path of the plunger 113 when the electro-magnet is not energized but allowing further motion of the plunger when the electro-magnet shifts the dog. A spring 129 normally urges the dog 124 into engaged position. A movement of the plunger beyond its preliminary position causes the plunger to engage the end portion 130 of the dog 66 to thereby shift the dog and release the bolt. The electrical lead 123' to the electro-magnet is conducted to the door by passing through the bore of the tubular arm 73. A guard portion 131 on the handle 108 (see Fig. 12) partially surrounds the push button 109 and prevents the latter from being operated by a chance blow.

It will be seen that the door may be opened from the inside while the vehicle is at rest by a light pressure on the button 109 which, however, cannot be operated when the vehicle speed is above a certain rate. Further only a small amount of current flows only for a very short period when the door is being opened and no current flows at any other time.

The dog 66 may be released and the door opened by means of the remote control handle 108 which is shown as rigidly attached to one end of the rotatable sleeve 114. The sleeve 114 includes at its other end a cam portion 132 (see Fig. 22) which, when the handle and sleeve are rotated, engages the extending portion 130 of the dog 66 and shifts the latter to release the bolt. An arm 133 is rigidly secured to the sleeve 114 and includes an arcuate portion 134 which carries a relatively heavy spring 135 which at one end engages the arm 133 and at the other a suitable apertured bracket 136 secured to the plate 16.

It will be seen that the remote control may be operated under heavy force, at all times, the spring 135 being of such nature that the handle may be turned only when a heavy force is applied thereto.

The control lever 92 may be shifted to and from the locked position by an interior locking lever 137 (see Fig. 12) which passes through a slot 138 in the plate 16 and is pivoted on the sleeve 114. The lever 137 includes an arm 139 with a bent up end 140 engaging a slot 141 in the end 99 of the control lever 92. As shown the slot 141 has a curved portion 142 engageable with a rounded edge of the bent up end 140.

The arm 139 includes a cam 143 which when the control lever is in the locked position, is in the path of movement of a cam 144 on the member 45 so that it will be lifted when the latter cam moves either forwardly or rearwardly. It will be seen that the latch will remain in locked condition when the control lever 92 is first lowered to the locked position by the locking lever 137 through the bent up end 140 engaging the slot 141 and the door is then closed while the outside handle is turned. With the cam parts in the broken line position of Fig. 4 wherein the outside door handle is turned, the abutment member 45 advances, the cam 144 engages the cam 143 and raises the arm 139. When the handle is released the lever 92 is shifted by the spring 91 so that the curved portion 142 of the slot 141 engages the end 140 of the arm 139.

If the door is closed with the locking lever in locking condition and without turning the outside door handle, the cams 143 and 144 return the mechanism to unlocked position. Further, the cams 143 and 144 return the mechanism to unlocked condition when the door is locked and then opened by either the finger tip control or the inside door handle.

*Operation*

Assuming that the vehicle is at rest with the door closed and the latch in locked position the operation may be as follows: The outside door handle 83 is semifloating and may be turned without result. Inserting the key and placing the latch in unlocked condition by shifting the control lever 92 permits the exterior handle to be turned to release the bolt.

It will be noted that as the door opens the bolt remains in retracted position so that the clothing or person of a passenger cannot be soiled by contact with the bolt and it will also be observed that the strike 78 being resiliently faced requires no lubrication since at no time is there any sliding action under pressure between bolt and strike. Further, it will be noted that in the absence of sliding action under pressure there is no wear so that a hardened bolt and strike are unnecessary and both parts may be stampings.

It will be further observed that the bolt is moved into tight clamping engagement with the strike by the straightening of the toggle links 36 and 38 so that the door cushions or bumpers 81 are tightly compressed.

The construction is such that the straightening action of the toggle occurs when the toggle is beyond the door glass guiding channel 147 and the latch is sufficiently thin to operate within the space between the door glass inner door wall.

To latch the door it is slowly moved to closed position (it may, however, be slammed if desired). The permitted slow movement tends to prevent closing the door upon the fingers. As the door is closed to an approximately fully latched position the toggle actuating mechanism is released by the action of the release arm 51 and first moves the bolt outwardly behind the strike, whereupon the bolt is moved laterally to engage the strike and move the door to fully closed position. The bolt mechanism is energized as the door is closed by the action of the arm 73 which is similar to the usual door check and the lead 123' to the electro-magnet passes through this arm so that a member already available serves as a wire guide and latch energizing member.

From within, the bolt may be locked to prevent release through the actuation of the outside handle by shifting the interior locking lever 137 which moves the control lever 92 to locked position.

When the vehicle is at rest, the bolt may be released (whether it is in locked or unlocked condition) by light pressure of the thumb or finger tip on the push button 109. The finger tip release enables a front seat occupant to reach back and without effort push a rear door button to release that door.

When the vehicle is running the speed control 125 automatically prevents actuation of the push button 109, beyond the preliminary position, to release the bolt but under this condition the remote control handle may be rotated by a heavy force. If the wiring circuit fails, the emergency handle is available for door opening.

If the passenger desires to alight and leave the vehicle in locked condition, he grasps the inside remote control handle 108 and when the vehicle is at rest, pushes the convenient button 109 to release the bolt. He may then without removing his hand from the handle move the locking lever 137 to locked position. He then leaves the vehicle, turns the outside handle and pushes the door shut. The door remains locked. Outside locking or unlocking may be performed with a key in the conventional manner.

To prevent accidental or thoughtless locking provision is made through the interaction of the cams 143 and 144 so that the mere shutting the door, without deliberately turning the outside door handle when the bolt is in locked condition, restores the bolt to unlocked condition.

In Figs. 23 to 30 a modification of the invention is shown in a door latch which is indicated generally at 200.

Figures 23, 24, 25, 26, 27, 28, 29, 30:
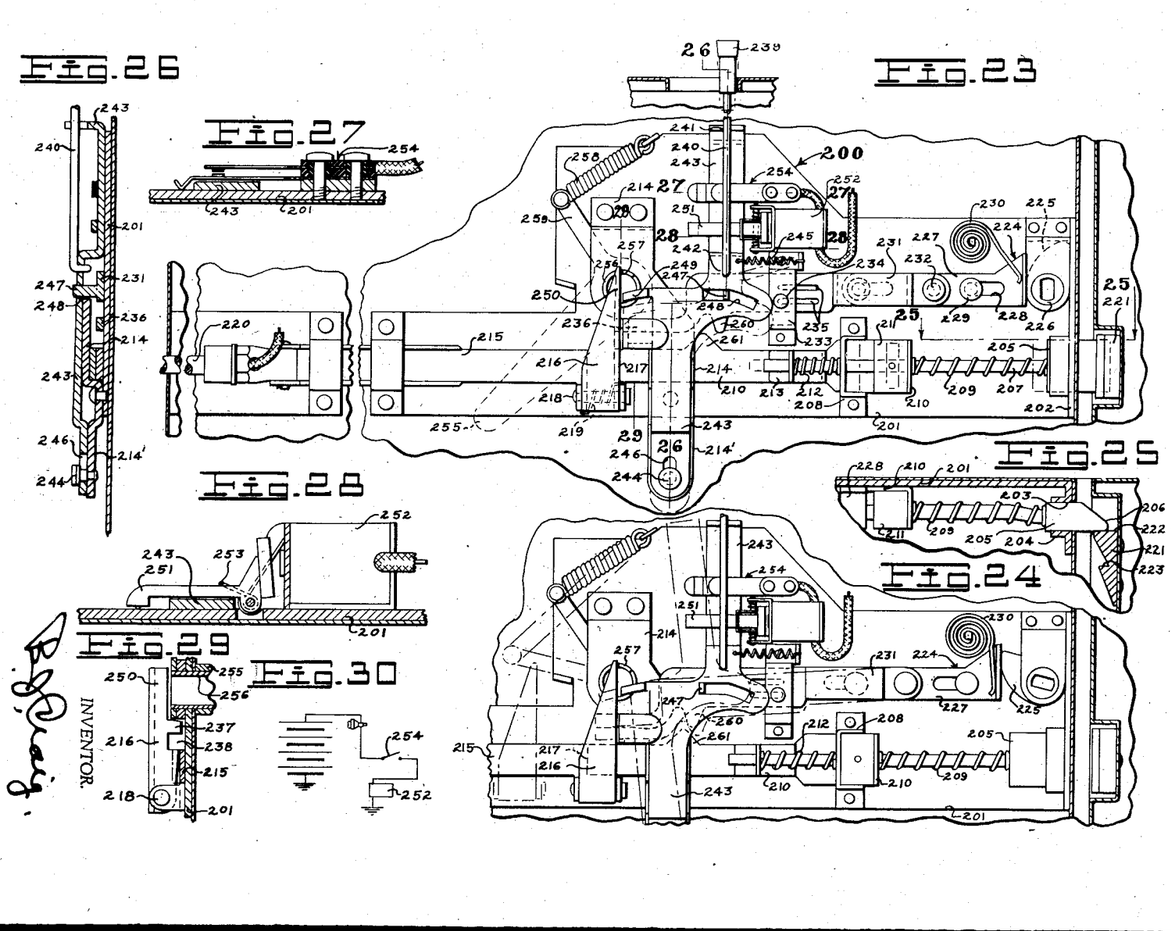
Fig. 23 is a side elevation, partly in section, showing a modification with the latch bolt in the advanced position.
Fig. 24 is a side elevation, partly in section, showing the latch with the bolt retracted and parts in another position.
Fig. 25 is a fragmentary section taken on line 25—25, Fig. 23.
Fig. 26 is a fragmentary section taken on line 26—26, Fig. 23.
Fig. 27 is a fragmentary section taken on line 27—27, Fig. 23.
Fig. 28 is a fragmentary section taken on line 28—28, Fig. 23.
Fig. 29 is a fragmentary section taken on line 29—29, Fig. 23.
Fig. 30 is a wiring diagram.
Figure 31:
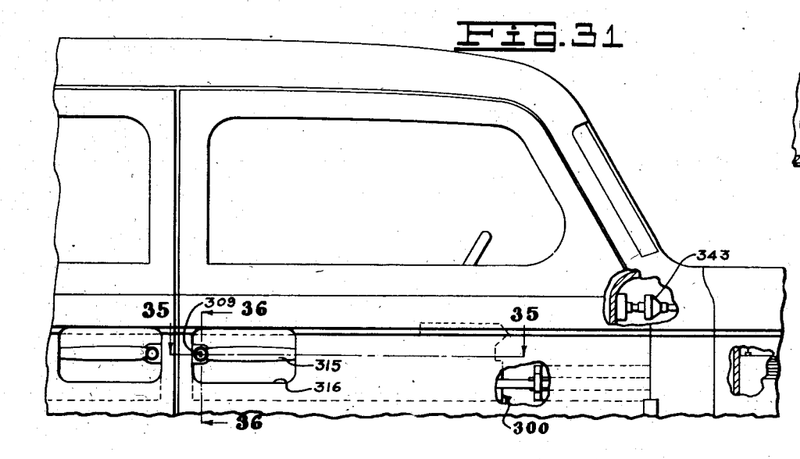
Fig. 31 is a fragmentary side elevation of an automotive vehicle showing a further modification.
Figure 32:
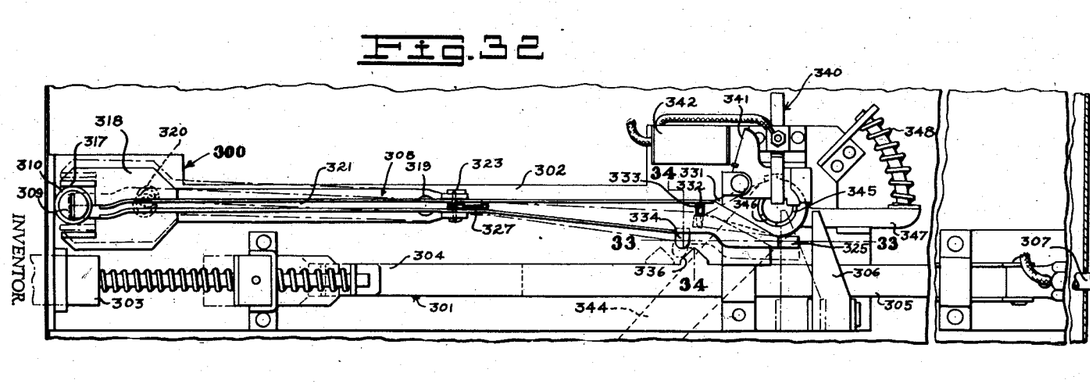
Fig. 32 is a side elevation of the further modified latch with parts broken away and showing the bolt in the retracted position.
Figure 33:
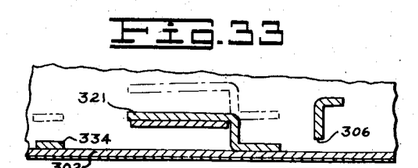
Fig. 33 is a fragmentary section taken on line 33—33, Fig. 32.
Figure 34:
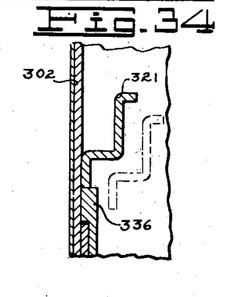
Fig. 34 is a fragmentary section taken on line 34—34, Fig. 32.

As shown the latch 200 includes a base plate 201 and a selvage plate 202 turned up therefrom and including a rectangular bolt slot 203 with inwardly extending peripheral guide portions 204 thereon. A bolt 205 of rectangular vertical section and having a bevelled end 206 slides within the slot 203 and is secured to a rod 207 which slidably engages a suitably apertured bracket 208 secured to the plate 201.

A spring 209 surrounding the rod 207, at one end engages the bolt 205 and at the other end engages an L-shaped abutment member 210 similar to the abutment member 45 previously described. A resiliently faced stop member 211 is interposed between the bracket 208 and the member 210 and is secured to the rod 207. A spring 212 surrounding the rod 207 engages the bracket 208 and a bracket 213 secured to the member 210. The member 210 slides beneath the bracket 208 and beneath a second bracket 214 also secured to the plate 201.

A push member 215 slides on the plate 201 beneath the member 210 and includes a dog 216 which is similar to the dog 66. The dog 216 engages the end 217 of the member 210 and is pivoted to the member 215 as at 218 and is urged toward the base plate by a spring 219. The push member 215 is similar to the push member 65 and is pivotally attached at its rear end to an arm 220 similar to the arm 73.

As the door is closed from the fully open position it will be seen that the push member 215 is urged forwardly until the dog 216 engages the end 217 of the member 210. Further motion of the door urges the bolt 205 forwardly and compresses the spring 212. Still further motion of the door brings the sloping face 206 of the bolt 205 into engagement with a strike 221 of usual construction including a bolt engaging face 222 and a safety catch 223. The spring 209 is compressed as the bolt rides over the bevelled portions of the strike.

It will be seen that the bolt is held in retracted position within the door by the spring 212 acting through the member 210 and the stop 211 except when the door is almost closed so that a passenger will not soil clothes of person in leaving or entering a vehicle.

In order to retract the bolt from the advanced position and free the door for opening the dog 216 must be released from engagement with the end 217 of the member 210, thus allowing the spring 212 to return the bolt.

Three means are shown by which the dog 216 may be tripped, namely, an outside door handle, a finger tip control, and an inside remote control. The release mechanism which is operable by an outside handle is indicated generally at 224 and includes a roll back 225 similar to the roll back 84 mounted on a sleeve 226 rotatable on the plate 201 and similar to the sleeve 85. The roll back 225 engages a tongue bent up from a sliding member 227 which includes slots 228 receiving pins 229 secured to the plate 201. The sliding member 227 is urged toward the roll back 225 by a spring 230 secured to the plate 201.

The release mechanism 224 includes a control lever 231 pivoted to the sliding member 227 as at 232 and sliding beneath a bracket 233 secured to the plate 201. The bracket 233 includes a barrel 234 mounted thereon and similar to the barrel 100 and similarly containing a spring urged ball engaging in either of two parallel grooves 235 in the control lever 231. It will be seen that the control lever 231 may be swung to either of two positions as defined by the grooves 235 and then may be reciprocated back and forth by the roll back 225 while in either turned position.

The control lever 231 includes an extending cam portion 236, similar to the cam portion 104 previously described, engageable with a companion portion 237 on the dog 216 when the lever 231 is in the upper or unlocked condition and passing through a slot 238 in the dog 216 when the lever 231 is in the lower or locked position. When the cam 236 engages the portion 237 the dog 216 is tripped and the bolt is released whereupon the door may be opened.

The lever 231 may be swung to and from the locked position by a finger tip control button 239 located above the garnish molding of the door. The button 239 is mounted on the upper end of a rod 240 engaging at its lower end (as at 241 and 242) in an arm 243 shiftable about a pin 244 mounted on an extension 214' of the bracket 214. The arm 243 is held in normal position by a spring 245. The pin 244 engages a slot 246 in the arm 243 so the arm 243 may be both rocked and reciprocated.

A tongue 247 on the lever 231 engages a slot 248 in the arm 243. The slot 248 is of such shape that the lever 231 may be freely reciprocated and the arm 243 may be freely rocked without interaction between the lever and the arm but it will be seen that the lever 231 may be rocked in either direction regardless of whether the latch is in locked or unlocked condition by reciprocation of the button 239.

The arm 243 further includes a projecting cam portion 249 engageable with an extension 250 on the dog 216 when the arm 243 is rocked about the pin 244.

The arm 243 may be rocked only when the vehicle is at rest. To prevent rocking of the arm when the vehicle is moving the arm 243 is prevented from shifting about its pivot by a dog 251 controlled by an electro-magnet 252 (see Fig. 28). The dog 251 is normally urged into engaged position by a spring 253. When the vehicle is in motion the circuit (see Fig. 30) is broken by a speed responsive device and the electro-magnet is rendered inoperative. When the vehicle is at rest the circuit may be closed by a switch 254 (see Fig. 27) operated by the initial rocking of the arm 243. Further rotation of the arm 243 trips the dog 216. It will be seen that the arm 243 has an initial movement before engaging the dog 251. This gives the switch sufficient time to operate and the dog sufficient time to be lifted.

The dog 216 may be tripped at all times by application of heavy pressure on a remote control handle 255 secured to a sleeve 256 similar to the sleeve 114, and rotatably mounted on the plate 201 and the bracket 214. The sleeve 256 includes a cam portion 257, similar to the cam 132, engageable with the portion 250 of the dog 216 when the sleeve is rotated. A spring 258 secured to the plate 201 engages the end of an arm 259 attached to the sleeve 256. The spring 258 is of such nature that the door may be opened by the remote control only upon the application of a heavy force.

When the member 210 moves forward or backward a cam 260 on the lever 231 engages a companion cam 261 on the member 210 when the lever 231 is in the locked position and lifts the lever 231. The action of the cams 260 and 261 is somewhat similar to the action of the cams 143 and 144 previously described. When the door is opened from locked condition by the inside finger tip or the inside handle means, the cams 260 and 261 return the mechanism to unlocked condition.

When the vehicle is at rest the bolt may be released by actuation of the outside door handle in the usual manner.

By pushing down on the push button 239 the bolt is placed in locked condition to prevent actuation of the outside door handle to release the bolt. The bolt may be released when the vehicle is at rest by pushing rearwardly on the push button 239 regardless of whether the latch is in locked or unlocked condition and regardless of whether the bolt is engaged in safety latched or fully latched positions.

The inside remote control handle serves as an emergency release and may be operated at all times to release the bolt regardless of the speed of the vehicle.

In Figs. 31 to 40 a further modification is indicated generally at 300 wherein the bolt and push member assembly (indicated generally at 301) is similar to the bolt and push member assembly of the modification 200, previously described, and includes a base plate 302, a bolt 303, an abutment member 304 and a push member 305 including a dog 306, and an arm 307 similar to the arm 73.

The dog 306 as shown may be tripped by three means; an outside push button, an inside finger tip control, and an inside remote control handle. The inside finger tip control and the inside remote control handle as shown are in all respects similar to those of the first described latch 10.

Figures 35, 36, 37, 40:
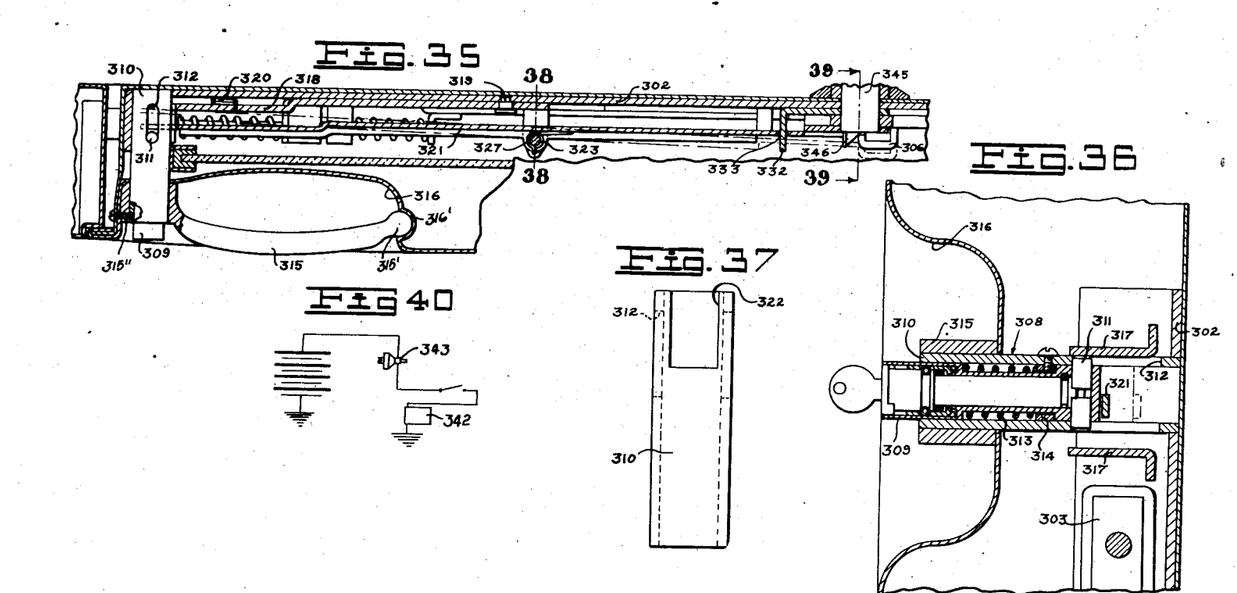
Fig. 35 is a fragmentary section taken on line 35—35, Fig. 31.
Fig. 36 is a fragmentary section taken on line 36—36, Fig. 31.
Fig. 37 is a side elevation of the lock cylinder.
Fig. 40 is a wiring diagram.
Figure 38:
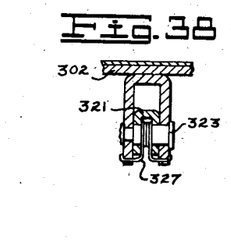
Fig. 38 is a section taken on line 38—38, Fig. 35.
Figure 39:
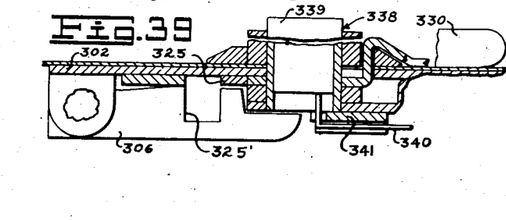
Fig. 39 is a fragmentary section taken on line 39—39, Fig. 35.

The release mechanism which is operated by an outside push buttom is indicated generally at 308 and includes a lock barrel 309 which also serves as a finger or thumb controlled push button. As shown in Fig. 36 the lock barrel 309 is similar in construction to the lock barrel 97 of the latch 10 and is slidable within the core of a hollow cylinder 310 fitting within an aperture in the base plate 302. The lock barrel 309 includes a transverse pin 311 which may be shifted by the action of the usual key and which is slidable within longitudinal slots 312 in the cylinder 310 preventing rotation of the lock barrel. The integral lock barrel and push button 309 is normally urged outwardly by a spring 313 surrounding the lock barrel and engaging a stop member 314.

As shown the integral lock barrel and push button may be mounted in the hub of an exterior fixed handle 315 fitted into a recess 316 in the door to present a neat flush appearance. The handle includes an end portion 315' while the recess includes a socket 316'. In assembling, the latch 300 is first attached to the inner panel of the door, the handle 315 is then fitted into place in the recess 316 with the portion 315', seated in the socket 316', and finally the cylinder 310 is inserted. It will be seen that the handle 315 is then immovably secured in place by a screw 315'' engaging in aligned openings in the door, in the cylinder 310 and in the handle 315 and any load applied to the handle is well distributed on the door.

The transverse pin 311 is engageable with wings 317 on an arm 318 pivoted to the base plate 302 as at 319. Rotation of the lock by the key will cause the pin 311 to rock the arm 318 up and down. A snap-over spring 320 engaging the arm and the base plate holds the arm in either upper or lower position.

The inner end of the integral lock barrel and button engages one end of a control lever 321 that passes through a slot 322 in the cylinder 310 and is pivoted to the arm 318 as at 323. The other end 325 of the control lever 321 is engageable with the dog 306 and trips the latter when the push button 309 is pushed inwardly when the end 325 is in the raised or unlocked position.

When the end 325 is in the lower or locked position and the button 309 is pushed inwardly, the end 325 merely moves away from the plate 302 in a slot 325' in the dog 306 and the dog is not tripped. The end 325 of the lever 321 is normally urged toward the plate 302 by a spring 327.

The lever 321 and the arm 318 may be shifted to locked or unlocked position by an inside locking lever 330 similar to the locking lever 137, previously described, and which includes an arm 331 with a bent up end 332 engaging a slot 333 in the lever 321.

A cam 334 on the lever 321 is engageable with a cam 336 on the member 305 when the end 325 of the control lever 321 is in the lower or locked position and when the end 325 rests against the plate 302. When, however, the exterior push buttom is operated and the end 325 is moved away from the plate, the cams 334 and 336 are no longer in the same plane and are inoperative.

When the door is to be locked the locking lever 330 is first operated to place the latch in locked condition and the door is then closed with the exterior button pushed inwardly.

Closing the door with the locking lever 330 in locked condtiion and without pushing inwardly on the exterior button restores the latch to the unlocked condition through the cams 334 and 336.

When the latch is in locked condition and the door is opened, the cams 334 and 336 restore the latch to unlocked condition.

The latch 300 includes an inner finger tip control 338 similar in all respects to the finger tip control 107, previously described, and includes a push button 339, a switch 340, and a dog 341 operated by an electro-magnet 342. The circuit to the electro-magnet includes a speed control 343.

The latch 300 further includes a remote control release similar to the remote control of the latch 10 and including a handle 344 secured to a sleeve 345 with a cam 346 on its inner end, and an arm 347 urged to normal position by a spring 348.

The operation of the latch 300 is similar to the operation of the latch 10 with the exception that pressing the exterior button is substituted for turning the outside door handle.

In order to aid in reading the claims and applying them to the structures shown herein and without limiting the claims to the detailed construction shown and described it will be understood that the expression "finger tip operated means" or similar expressions refer to means which can be operated by light pressure such as might be readily exerted without undue effort by the tip of the average person's finger or the equivalent pressure, and that the expression "hand operated control means" refers to means which can be operated only by a pressure which is greater than can readily be produced by the tip of the average person's fingers and refers to control means which requires such pressure that the act would not be performed in what might be termed to be an unconscious manner.

The "speed control means" or similar expressions used herein refers to means which is subject to, or under control of, the speed of the vehicle while the expression "bolt release means" or similar expressions refers to means the operation or actuation of which will free the bolt so the door may be opened.

The expressions "inside finger tip controlled means" and "outside finger tip controlled means" or similar expressions refer to means accessible from within and to means accessible from without the vehicle respectively, although in some of the broader claims such expressions as "finger tip means" refers to such means regardless of whether it is within or without the vehicle.

Having thus described my invention, I claim:

1. In an automotive vehicle door latch, a bolt movable to engaged and released positions, a handle and vehicle speed influenced means movably mounted on the handle for releasing the bolt.

2. In an automotive vehicle door latch, a bolt movable to engaged and released positions, a hand operated rotary member operable to release the bolt, the member having a bore and a second member reciprocatingly mounted for axial movement in the bore and operable to release the bolt.

3. In an automotive vehicle door latch, a bolt movable to engaged and released positions, a handle member adapted to be secured upon a door and vehicle speed influenced finger tip operated means mounted on the handle member and movable independently of the handle member for releasing the bolt.

4. In an automotive vehicle door latch, a bolt movable to engaged and released positions, a rotary remote control member operable to release the bolt, and a speed influenced finger tip operated control member mounted coaxial with the remote control member and movable when the vehicle speed is below a certain rate to release the bolt.

5. In an automotive vehicle door latch, a bolt movable to engaged and released positions, an inside remote control member operable to release the bolt, and a vehicle speed influenced finger tip operated control member mounted on the remote control member and movable independently of the remote control member when the vehicle speed is below a certain rate to release the bolt.

6. In an automotive vehicle door latch, a bolt movable to engaged and released positions, a rotary control member operable to release the bolt, and a vehicle speed controlled finger tip operated control member accessible to a digit of a hand on the rotary control member and movable to release the bolt, and a guard member about the finger tip operated member.

7. In an automotive vehicle door latch, a bolt movable to released and engaged positions, means to release the bolt, means to normally restrain actuation of the release means, and push button means operable to a preliminary position to free the restraining means and thereafter operable to a final position to release the bolt, and guard means about the push button and arranged to prevent accidental movement of the push button beyond the preliminary position.

8. In an automotive vehicle door latch, a bolt movable to released and engaged positions, means to release the bolt, and finger tip operated means operable to a preliminary non-releasing position regardless of the speed of the vehicle and operable to a final bolt releasing position only when the vehicle speed is less than a certain rate, and guard means about said finger tip operated means to prevent chance movement of the bolt beyond the preliminary position.

9. In an automotive vehicle door latch, a bolt movable to engaged and released positions, an inside door handle, a speed influenced member mounted on the handle and movable when the vehicle speed is below a certain rate to release the bolt, means operable from without the vehicle to release the bolt, preventing means to render actuation of said outside control means ineffective to release the bolt, and means accessible to the digit of a hand engaging said handle for shifting said preventing means.

10. In an automotive vehicle door latch, a bolt movable to engaged and released positions, a rotary remote control member operable to release the bolt, a speed influenced finger tip operated member movable when the vehicle speed is below a certain rate to release the bolt, means operable from without the vehicle to release the bolt, preventing means to render actuation of said outside control means ineffective to release the bolt and means mounted coaxial with said remote control member and operable for shifting said preventing means.

11. In an automotive vehicle door latch, a bolt movable to advanced and retracted positions, means urging the bolt to advanced and to retracted positions, means to energize the advancing and the retracting means, means permitting the bolt to retract in passing over a strike without de-energizing the retracting means and vehicle speed controlled means operable to release the bolt.

12. In an automotive vehicle door latch, a bolt movable to engaged and released positions, a spring for urging the bolt to engaged position, a movable abutment engaging the spring to tension the latter, means operated by door movement when the door moves from a partially closed towards a closed position to move the abutment member and bolt towards advanced position while permitting the bolt to retract while passing over a strike, and vehicle speed controlled means operable to release the bolt.

13. In an automotive vehicle door latch, a bolt movable to engaged and released positions, means to release the bolt, said means including a member mounted to move about two pivots the axes of which are disposed at an angle to each other, means on said member to release the bolt when the member is moved about one axis when turned to one position about the other axis, and means to prevent release of the bolt when the member is similarly moved about the one axis while the member is turned to another position about the other axis.

14. In an automotive vehicle latch construction, a door having a recess in its outer wall, a handle member arranged in the recess, said handle and the wall of the recess having releasable interlocking portions and releasable means engaging the door and handle remote from the interlocking portions for securing the handle on the door.

15. In an automotive vehicle latch construction, a handle member having a recess therein, a latch controlling lock member mounted in said recess, and a member engaging said handle member, said lock member and the door to hold the parts assembled.

16. In an automotive vehicle latch construction, a door having a recessed outer wall, a handle member arranged in said recess and having a portion releasably interlocked with the wall of the recess, means engaging the door and handle remote from the interlocked portion for securing the handle on the door, a bolt movable to engaged and released positions, and means slidably mounted on the handle for releasing said bolt.

17. In an automotive vehicle door latch construction, a bolt movable to released and engaged positions, a handle adapted to be fixed upon the exterior of a door, vehicle speed controlled push button means accessible for operation by a digit of a hand engaging the handle to release the bolt, means operable from within a vehicle to actuate the bolt releasing means, and means to condition the bolt to prevent release thereof by operation of said push button while permitting actuation of the inside means to release the bolt.

18. In a latch construction for automotive vehicles, a bolt movable to engaged and released positions, vehicle speed controlled means for controlling movement of the bolt to released position, a check member adapted to engage the wall of the door opening and a vehicle door to limit the opening movement of the door, and means operated by the check member for energizing the bolt controlling means.

19. In a latch construction for automotive vehicles, a bolt movable to engaged and released positions, means for controlling movement of the bolt, electro-magnetically influenced means for actuating the control means, a member adapted to engage the wall of a door opening and a door and shiftable across a door as the latter is moved, means operated by the member for conditioning the bolt controlling means, and a lead on the member for supplying current to said electro-magnetically influenced means.

20. In a latch construction for automotive vehicles, a bolt movable to engaged and released positions, means for controlling movement of the bolt, electro-magnetically influenced means for actuating the control means, a lead for the electro-magnetic means, a check member adapted to engage a door frame and a door to limit the opening movement of the door, and means operated by the check member for conditioning the bolt controlling means, the check member including a tubular portion, the lead extending through the tubular portion.

21. In an automotive vehicle latch construction, an outside handle, a bolt movable to engaged and released positions, means remote from the outside handle and operable to release the bolt, a remote control handle rotatably mounted on the door adjacent to the release means, means operable by rotation of the remote control handle to actuate the release means, an operating member on the outside handle, and control means extending from the operating member to the release means and actuated by movement of the operating member for actuating the release means.

22. In an automotive vehicle latch construction, an outside handle, a bolt movable to engaged and released positions, means remote from the outside handle and operable to release the bolt, a remote control handle rotatably mounted adjacent to the release means, means operable by rotation of the remote control handle upon the application of a heavy force to actuate the release means, finger tip operated means operable upon the application of a light force to actuate the release means, vehicle speed influenced means for controlling operation of the finger tip means, an operating member mounted on the outside handle, control means extending from the operating member to the release means and actuated by movement of the operating member to release the bolt, and means to render actuation of the control means ineffective to release the bolt.

23. In an automotive vehicle door latch, a bolt movable to engaged and released positions, a hand grip member and vehicle speed influenced means accessible to a digit of a hand on the hand grip member for releasing the bolt.

24. In an automotive vehicle latch construction, a door including a recess in its outer wall, a grip member in the recess, a bolt, and vehicle speed controlled bolt releasing means, including an operating portion accessible to a digit of a hand engaging the grip member for releasing the bolt.

25. In an automotive vehicle door latch construction, a bolt movable to engaged and released positions, a hand grip member, a vehicle speed controlled push button accessible to a digit of a hand on the grip member and operable to release the bolt and lock means to prevent release of the bolt by actuation of the push button.

26. In an automotive vehicle door latch construction, a bolt movable to engaged and released positions, a vehicle speed controlled push button member operable to release the bolt and key operated lock means in the push button and operable to prevent release of the bolt by actuation of the push button.

27. In an automotive vehicle door latch, a bolt movable to engaged and released positions, a hand engageable rotary control member operable to release the bolt, and a finger tip operated control member on the hand engageable rotary control member for movement independent of the rotary control member and movable to release the bolt, and a guard member about the finger tip operated control member.

28. In an automotive vehicle latch construction, a door having a recess in its outer wall, a grip member extending across the recess and including a part spaced from the inner wall of the recess, a door bolt, a lock member for the bolt, and means to secure the lock member to the grip member and the grip member to the door.

29. In an automotive vehicle latch construction, a door having a recess in its outer wall, a handle, means to secure the handle in the recess, a bolt, a lock member including a portion passing through the handle, means to secure the lock member in position, and means associated with the lock member and accessible to a digit of a hand engaging the handle for releasing the bolt.

30. In an automotive vehicle door latch, a bolt movable to engaged and released positions, an inside door handle, a member accessible to a digit of a hand on the handle and movable to release the bolt, means operable from without the vehicle to release the bolt, preventing means to render actuation of said outside means ineffective to release the bolt, and means accessible to a digit of a hand engaging said handle for shifting said preventing means.

31. In an automotive vehicle door latch, a bolt movable to engaged and released positions, an inside door handle, a vehicle speed influenced member accessible to a digit of a hand on the handle and operable when the vehicle speed is below a certain rate to release the bolt, means operable from without the vehicle to release the bolt, preventing means to render actuation of said outside means ineffective to release the bolt, and means accessible to a digit of a hand engaging said handle for shifting said preventing means.

32. In an automotive vehicle latch construction, an outside door handle, a bolt movable to engaged and released positions, a remote control handle mounted on the door, means operable by the remote control handle to release the bolt, an operating member accessible to a digit of a hand engaging the outside handle, control means extending from the operating member to the release means and actuated by movement of the operating member for actuating the release means and a lock member mounted on the operating member.

33. In an automotive vehicle latch construction, an outside door handle, a bolt movable to engaged and released positions, means remote from the outside handle and operable to release the bolt, a remote control handle mounted on the door, means operable by the remote control handle to actuate the release means, an operating member accessible to a digit of a hand engaging the outside handle, and control means extending from the operating member to the release means and actuated by movement of the operating member for actuating the release means.

34. In an automotive vehicle door latch, a bolt movable to engaged and released positions, means to release the bolt, said means including a member having a reciprocatingly mounted pivotal support, and means to release the bolt when the member is moved in one direction while turned to one position about its pivot, the last means being ineffective to release the bolt when the member is similarly moved while it is turned to another position about its pivot.

35. In an automotive vehicle door latch, a bolt movable to engaged and released positions, means to release the bolt, said means including a member having a reciprocatingly mounted pivoted support, and means to release the bolt when the member is moved in one direction while turned to one position about its pivot, the last means being ineffective to release the bolt when the member is similarly moved while it is turned to another position about its pivot, and lock controlled means accessible from without the vehicle for moving the member to the other position.

36. In an automotive vehicle door latch, a bolt movable to engaged and released positions, means to release the bolt, the reelase means including a member mounted to move about two pivots the axes of which are disposed at an angle to each other, means on the member to release the bolt when the member is moved about one axis when turned to one position about the other axis, and means to prevent release of the bolt when the member is similarly moved about the one axis while the member is turned to another position about the other axis and means to move the member to the one position when the bolt is advanced to engaged position while the member is in the other position.

BURNIE J. CRAIG.